DON CARLOS GRUNDVIG.
SECTIONAL WHEEL.
APPLICATION FILED MAY 11, 1918.

1,281,947.

Patented Oct. 15, 1918.

Inventor
Don Carlos Grundvig
By Watson E. Coleman
Attorney

UNITED STATES PATENT OFFICE.

DON CARLOS GRUNDVIG, OF CAMP LEWIS, WASHINGTON.

SECTIONAL WHEEL.

1,281,947.  Specification of Letters Patent. Patented Oct. 15, 1918.

Application filed May 11, 1918. Serial No. 233,873.

*To all whom it may concern:*

Be it known that I, DON CARLOS GRUNDVIG, a citizen of the United States, residing at Camp Lewis, in the county of Pierce and State of Washington, have invented certain new and useful Improvements in Sectional Wheels, of which the following is a specification, reference being had to the accompanying drawings.

This invention relates to certain improvements in sectional wheels and it is an object of the invention to provide a novel and improved device of this general character whereby the same may be readily and conveniently applied to or removed from a shaft or the like.

It is also an object of the invention to provide a novel and improved device of this general character comprising two sections one of said sections having a continuous and unbroken rim operatively engaged with a section of a hub and wherein the second section comprises a section of a hub having members extending therefrom whereby both of the sections of the wheel may be maintained in assembled relation and the wheel held in applied position.

The invention consists in the details of construction and in the combination and arrangement of the several parts of my improved sectional wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein.

Figure 1:
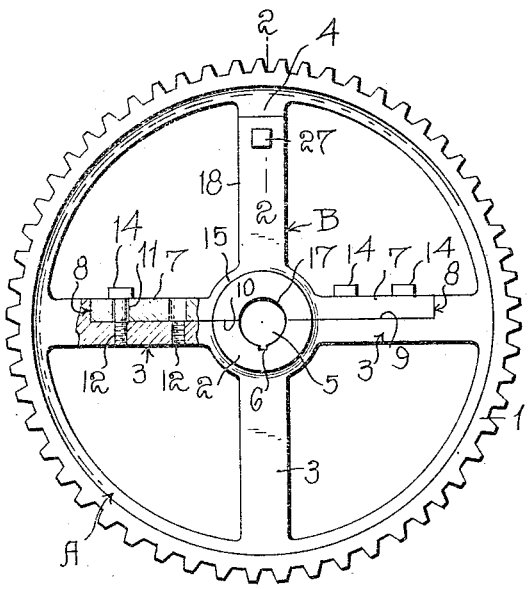
Figure 1 is a view partly in elevation and partly in section illustrating a sectional wheel constructed in accordance with an embodiment of my invention and in assembled relation.
Figure 2:
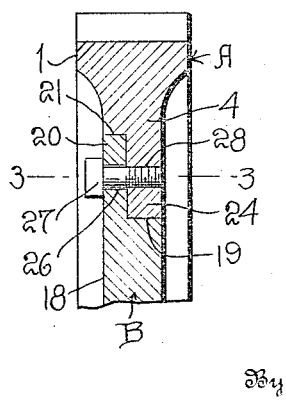
Fig. 2 is an enlarged sectional view taken substantially on the line 2—2 of Fig. 1.
Figure 3:
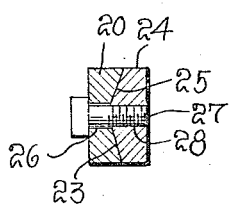
Fig. 3 is a transverse sectional view taken through the connected portion of the stem of the inner section and the lug of the outer section of my improved wheel as herein disclosed.

My improved wheel may constitute a gear, pulley or the like and as illustrated in the accompanying drawings the embodiment of my invention as herein disclosed relates to a gear.

As herein set forth my improved wheel comprises two sections A and B. The section A consists of an annular continuous and unbroken rim 1 having at its axial center the hub section 2. The rims 1 and 2 are connected by the spokes 3 with a pair of said spokes substantially diametrically opposed and the field defined by the rim 1 at one side of the diametrically opposed spokes is unobstructed except for the inwardly directed lug or extension 4 carried by the rim and arranged radially of the hub section 1 in a plane perpendicular to the plane occupied by the diametrically opposed spokes. The hub section 2 as herein disclosed constitutes one-half of the hub section and the shaft receiving groove 5 provided in the hub section 2 has a keyway 6 to receive the key carried by a shaft or the like with which the wheel is adapted to be engaged. The section B of my improved wheel as herein disclosed is substantially T-shape in form and the oppositely directed members 7 constitute the head of the section B snugly fitted within the reduced portions 8 of the diametrically opposed spokes 3 hereinbefore referred to and the longitudinal faces 9 of said reduced portions 8 are flush with the straight face 10 of the hub 2 of the section A. The outer end portions of each of the members 7 is provided therethrough with the openings 11 having their walls smooth and which openings 11 are adapted to register with the threaded openings 12 produced in the coacting spokes 3 of the section A. The clamping bolts 14 are freely inserted through the openings 11 and engaged with the openings 12 whereby the section B or more particularly the members 7 thereof will be effectually clamped in applied position.

The junction between the oppositely directed members 7 also constitutes a hub section 15 which coacts with the hub section 2 of the section A and the straight face of the hub section 15 is provided with the shaft receiving groove 17 which registers with the shaft receiving groove 5 in the hub section 2 of the section A of the wheel. The central member or stem 18 of the section B has its outer or free end portion reduced as at 19 to afford an extension 20 which engages within the reduced portion 21 of the lug or extension 4. The inner face of the extension 20 of the member or stem 18 is provided with a groove or channel 23 extending longitudinally thereof and which is preferably V-shape in cross section with its major diameter substantially equal to the width of the extension 20. The coacting or opposed face of the supplemental extension 24 of the lug 4 as afforded by the reduced portion 21 is formed with a tongue 25 snugly seating within the groove 23 so that the connection between the member or stem 18 and the lug 4 is reinforced against the strain imposed upon the wheel during the rotation thereof. The extension 20 of the member or stem 18 is provided with an opening 26 through which the clamping bolt 27 is loosely directed and which bolt 27 has threaded engagement with the opening 28 produced in the extension 24 of the lug 4 whereby the member or stem 18 is maintained in proper engagement with the lug 4.

From the foregoing description, it is thought to be obvious that a sectional wheel constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A sectional wheel comprising two members, one of said members consisting of a continuous and unbroken rim, a hub section and spokes connecting said hub section and rim, a pair of said spokes being substantially diametrically opposed, the field defined by the rim at one side of the substantially diametrically opposed spokes being unobstructed, an inwardly directed lug carried by the rim and arranged radially of the hub section and a second member substantially T-shape in form, the extremities of the hub being detachably engaged with the substantially diametrically opposed spokes and the outer end portion of the stem of the second member being detachably engaged with the inwardly directed lug of the first member, the intermediate portion of the head of the second member constituting a second section of the hub.

2. A sectional wheel comprising two members, one of said members consisting of a continuous and unbroken rim, a hub section and spokes connecting said hub section and rim, a pair of said spokes being substantially diametrically opposed, the field defined by the rim at one side of the substantially diametrically opposed spokes being unobstructed, an inwardly directed lug carried by the rim and arranged radially of the hub section and a second member substantially T-shape in form, the extremities of the hub being detachably engaged with the substantially diametrically opposed spokes, and the outer end portion of the stem of the second member being detachably engaged with the inwardly directed lug of the first member, the intermediate portion of the head of the second member constituting a second section of the hub, the free end portions of the lug of the first member and the stem of the second member overlying, the opposed face of said stem and lug being provided with an interlocking tongue and groove.

3. A sectional wheel comprising two members, one of said members consisting of a continuous and unbroken rim, a hub section and spokes connecting said hub section and rim, a pair of said spokes being substantially diametrically opposed, the field defined by the rim at one side of the substantially diametrically opposed spokes being unobstructed, an inwardly directed lug carried by the rim and arranged radially of the hub section and a second member substantially T-shape in form, the extremities of the hub being detachably engaged with the substantially diametrically opposed spokes, and the outer end portion of the stem of the second member being detachably engaged with the inwardly directed lug of the first member, the intermediate portion of the head of the second member constituting a second section of the hub, the substantially diametrically opposed spokes being reduced, the base of said reduced portion being in continuity with the straight face of the hub section of the first member, the head of the second member seating within said reduced portion.

4. A sectional wheel comprising two members, one of said members consisting of a continuous and unbroken rim, a hub section and spokes connecting said hub sections and rim, a pair of said spokes being substantially diametrically opposed, the field defined by the rim at one side of the substantially diametrically opposed spokes being unobstructed, an inwardly directed lug carried by the rim and arranged radially of the hub section and a second member substantially T-shape in form, the extremities of the hub being detachably engaged with the substantially diametrically opposed spokes and the outer end portion of the stem of the second member being detachably engaged with the inwardly directed lug of the first member, the intermediate portion of the head of the second member constituting a second section of the hub, the outer extremities of the lug of the first member and the stem of the second member being reduced in thickness to afford extensions in overlying relation.

5. A sectional wheel comprising two members, one of said members consisting of a continuous and unbroken rim, a hub section and spokes connecting said hub section and rim, a pair of said spokes being substantially diametrically opposed, the field defined by the rim at one side of the substantially diametrically opposed spokes being unobstructed, an inwardly directed lug carried by the rim and arranged radially of the hub section and a second member substantially T-shape in form, the extremities of the hub being detachably engaged with the substantially diametrically opposed spokes and the outer end portion of the stem of the second member being detachably engaged with the inwardly directed lug of the first member, the intermediate portion of the head of the second member constituting a second section of the hub, the outer extremities of the lug of the first member and the stem of the second member being reduced in thickness to afford extensions in overlying relation, the opposed faces of said overlying extensions being provided with longitudinally disposed interfitting tongue and groove.

In testimony whereof I hereunto affix my signature in the presence of two witnesses.

DON CARLOS GRUNDVIG.

Witnesses:
N. G. NELSON,
W. F. SHEARD.

Copies of this patent may be obtained for five cents each, by addressing the "Commissioner of Patents, Washington, D. C."